United States Patent
Kanungo et al.

(10) Patent No.: US 10,841,287 B2
(45) Date of Patent: Nov. 17, 2020

(54) SYSTEM AND METHOD FOR GENERATING AND MANAGING A KEY PACKAGE

(71) Applicant: Tala Secure Inc., Mountainview, CA (US)

(72) Inventors: Rajesh Kanungo, Mountain View, CA (US); Rampura Venkatachar Raman, Bangalore (IN); Benjamin R Loomis, Sunnyvale, CA (US)

(73) Assignee: Tala Secure, Inc., Mountain View, CA (US)

( * ) Notice: Subject to any disclaimer, the term of this patent is extended or adjusted under 35 U.S.C. 154(b) by 104 days.

(21) Appl. No.: 16/179,965

(22) Filed: Nov. 4, 2018

(65) Prior Publication Data
US 2020/0145395 A1    May 7, 2020

(51) Int. Cl.
| | | |
|---|---|---|
| H04L 29/06 | (2006.01) | |
| H04L 9/08 | (2006.01) | |
| G06F 8/61 | (2018.01) | |
| G06F 8/65 | (2018.01) | |
| H04W 8/18 | (2009.01) | |
| H04W 12/04 | (2009.01) | |
| H04L 29/08 | (2006.01) | |

(52) U.S. Cl.
CPC .............. *H04L 63/061* (2013.01); *G06F 8/63* (2013.01); *G06F 8/65* (2013.01); *H04L 9/0825* (2013.01); *H04L 9/0841* (2013.01); *H04L 9/0861* (2013.01); *H04L 63/0428* (2013.01); *H04L 63/0853* (2013.01); *H04W 8/183* (2013.01); *H04W 12/04* (2013.01); *H04L 67/34* (2013.01)

(58) Field of Classification Search
CPC ... H04L 63/061; H04L 9/0825; H04L 9/0841; H04L 63/0853; H04L 63/0428; H04L 9/0861; H04L 67/34; H04L 9/3247; H04L 9/0822; H04L 9/0891; H04W 12/04; H04W 8/183; H04W 12/004; H04W 8/205; G06F 8/65; G06F 8/63; G06F 21/575
See application file for complete search history.

(56) References Cited

U.S. PATENT DOCUMENTS

| | | | | |
|---|---|---|---|---|
| 10,057,243 | B1 * | 8/2018 | Kumar | H04L 9/0891 |
| 2007/0186108 | A1 * | 8/2007 | Passarella | H04W 12/0013 |
| | | | | 713/171 |
| 2009/0210702 | A1 * | 8/2009 | Welingkar | H04W 12/0023 |
| | | | | 713/156 |
| 2012/0300932 | A1 * | 11/2012 | Cambridge | H04W 12/0013 |
| | | | | 380/270 |
| 2013/0198519 | A1 * | 8/2013 | Marien | G06F 21/34 |
| | | | | 713/172 |

(Continued)

*Primary Examiner* — Cheng-Feng Huang

(57) ABSTRACT

The embodiment herein provides a method for securely transmitting a firmware update image to a device using a key management system. The key management subsystem includes a cellular modem. The method includes (i) configuring a SIM of the cellular modem to update a public key of a server using a key manager module of the Subscriber Identity Module (SIM), (ii) enabling the SIM to receive an encrypted key package from the server, using the cellular modem, (iii) processing the encrypted firmware update image that has to be transmitted to the device using the SIM and (iv) transmitting the decrypted key package to the device to enable implementation of the decrypted key package into the device using the SIM.

11 Claims, 9 Drawing Sheets

(56) References Cited

U.S. PATENT DOCUMENTS

| | | | |
|---|---|---|---|
| 2015/0326568 A1* | 11/2015 | Hauck | H04L 63/06 |
| | | | 713/168 |
| 2016/0188889 A1* | 6/2016 | Narendra Trivedi | |
| | | | G06F 21/6218 |
| | | | 713/189 |
| 2016/0301529 A1* | 10/2016 | Park | H04L 67/303 |
| 2018/0144147 A1* | 5/2018 | Nix | H04L 9/0869 |
| 2018/0375649 A1* | 12/2018 | Goller | H04W 12/04 |
| 2019/0166117 A1* | 5/2019 | Kumar | H04L 9/321 |

* cited by examiner

SYSTEM AND METHOD FOR GENERATING AND MANAGING A KEY PACKAGE

BACKGROUND

Technical Field

The embodiments herein generally relate to a secure communication of one or more keys, and, more particularly, to a system and method for securely sharing one or more keys between a server and a device using a cellular modem with a Subscriber Identity Module (SIM).

Description of the Related Art

The Internet of Things (IoT) devices are all unique and uniquely identified. The IoT device has to respond with at least one of signature, a private key or a symmetric key. The injection of the key in the IoT device may be performed on the Central Processing Unit (CPU). The injection of the key in the IoT device is protected by One Time Programmable memory (OTP). The sharing of symmetric key may lead to possible theft while being shared with the device. The private key is typically generated by the processor of the device which may also lead to possible theft as like the symmetric key. Further, the private key generation may also be subjected to manipulation unless the CPU random number generation is secure. Generally, the device is connected with a key server to retrieve keys over a secure link and is shared with the device over an un-secure link. It is hard for an IoT vendor to use a contract manufacturer and to provide a guarantee to the customers regarding the security of the keys. This requires a higher level and/or alternate keys to be used during provisioning which replaces the factory keys. In general, higher level keys or alternate keys are not stored in the OTP and are, therefore, subject to theft. Also, if the OTP keys in the factory are compromised, it may lead to a breach in security of any future key updates since all new keys are encrypted with existing keys. Existing systems use Perfect forward secrecy (e.g. ECDHE) but that is not always available for protocols that are used for loading keys. Sometimes, the keys need to be injected using a serial link. Transport layer security (TLS) does have options for ECDHE, but it may not be available in an operational setup environment. Storing a large number of keys in the OTP is extremely difficult as the capacity of OTP to store keys is limited. There is a lack of portability of the secure element between CPUs and operating systems. Each secure element needs to be verified for each OS-CPU-manufacturing facility. Any breach in verification may lead to issues.

Legacy devices with no or weak cryptographic (decryption and signature verification) keys are currently shipped and the new IoT devices have security issues related to the absence of keys, reuse of keys, or use of weak cryptographic keys. Moreover, these devices, even when upgraded over the network, may not be sent keys in a cryptographically secure manner as they lack a device-specific unique symmetric key or a private key. Hence, any payload sent over the network can, at some point, be decrypted by a listening third party. The only way to safely deploy these keys is via physical means like a USB flash drive, one per device. Many IoT devices have ports available to inject keys. When keys are burnt into the Hardware (HW) and if they get compromised, there is no way to fix it easily.

A cellular Subscriber Identity Module (SIM) is a well-known cryptography service providing an element that performs encryption, decryption, Signing and signature verification. The SIM is tamper resistant and provides a root of trust and other security functions for cellular modems. The secure functions include at least storing private and public keys. The SIM additionally stores information on payment and configurations. SIM may load and run the approved applications which may access, store and use approved keys of devices or the SIM. The SIM may communicate with external devices securely and it may facilitate the access to and from a main application processor of the device. Further, the SIM is a tamper-proof piece of hardware and it is issued by cellular service providers and mobile virtual network operators (MVNO). Each country has laws regarding the protection of the keys in the SIM. The SIM security is well understood. SIM's may also be extended by adding applets. SIMs are independent of the IoT platform. Hence, a SIM is a provably secure element.

Accordingly, there remains a need for a system and method for securely transmitting one or more keys between servers and devices using a SIM.

SUMMARY

In view of the foregoing, an embodiment herein provides a system for securely transmitting one or more keys to a device. The system includes a cellular modem that is communicatively connected with the device. The cellular modem includes a Subscriber Identity Module (SIM). The SIM includes a key manager module that is adapted to (i) configure the SIM to update a public key of a server, (ii) enable the SIM to receive an encrypted key package from the server, (iii) process the encrypted key package that has to be transmitted to the device and (iv) transmit the decrypted key package to the device to enable implementation of the decrypted key package into the device. The processing of the encrypted key package includes decrypting the encrypted key package associated with the device with at least one of a private key of the SIM and verifying the key package using the public key of the SIM.

The encrypted key package is generated using the server by (a) generating a key package by processing one or more keys associated with the device, (b) signing the key package with a private key of the server and (c) encrypting the key package with a public key of the SIM to obtain the encrypted key package. The encrypted key package includes one or more keys that are specific to the device, and at least one of (a) metadata associated with the one or more keys, (b) one or more counters associated with the one or more keys, (c) a firmware update data associated with the device or (d) a date and a time when the one or more keys are created. The one or more keys are obtained from a key server.

In some embodiments, the key manager module is adapted to configure the SIM with an operational symmetric SIM key that is shared with the server when the key package is encrypted with the operational symmetric SIM key.

In some embodiments, the key manager module decrypts the encrypted key package associated with the device using the operational symmetric SIM key of the server.

In some embodiments, the key manager module is adapted to enable multi-stage decryption process by partially decrypting the encrypted key package and providing an encryption key to the device to fully decrypt the partially decrypted key package.

In some embodiments, the key manager module is configured to enable the SIM to communicate with the server and the device for receiving and transmitting messages.

In some embodiments, the server includes a manufacturing server or an operation server.

In another aspect, a system for securely transmitting one or more keys to a server. The system includes a cellular modem that is communicatively connected with the device. The cellular modem includes a Subscriber Identity Module (SIM). The SIM includes a key manager module that is adapted to (i) configure the SIM to update a public key of a server, (ii) enable the SIM to receive an encrypted key package from the device, (iii) sign the key package with a private key of the SIM and (iv) encrypt the key package with a public key of the server to obtain the encrypted key package and (v) transmit the encrypted key package to the server to store the encrypted key package The device generates the key package by processing one or more keys associated with the device. The encrypted key package includes the one or more keys that are specific to the device, and at least one of metadata associated with the one or more keys, one or more counters associated with the one or more keys, or a date and a time when the one or more keys are created.

In some embodiments, the key manager module is adapted to encrypt the key package with an operational symmetric SIM key that is shared with the server.

In some embodiments, the server decrypts the encrypted key package using the operational symmetric SIM key.

In some embodiments, the key manager module is adapted to enable multi-stage encryption process by receiving a partially encrypted key package and an encryption key from the device to fully encrypt the partially encrypted key package.

In some embodiments, the key manager module is configured to enable the SIM to communicate with the server and the device for receiving and transmitting messages.

In some embodiments, the server includes a manufacturing server or an operation server.

In yet another aspect, a method for securely transmitting a firmware update image to a device using a key management system includes (i) configuring the SIM to update a public key of a server using a key manager module of the Subscriber Identity Module (SIM), (ii) enabling the SIM to receive an encrypted key package from the server, using the cellular modem, (iii) processing the encrypted firmware update image that has to be transmitted to the device using the SIM and (iv) transmitting the decrypted key package to the device to enable implementation of the decrypted key package into the device using the SIM. The processing of the encrypted key package includes decrypting the encrypted key package associated with the device with at least one of a private key of the SIM or the public key of the SIM. The encrypted key package is generated by (a) generating a key package by processing a firmware update image associated with the device using the server, (b) signing the key package with a private key of the manufacturing server, (c) encrypting the key package with a public key of the SIM to obtain the encrypted key package. The firmware update image is obtained from a manufacturing server. The encrypted key package includes the firmware update image that is specific to the device, and at least one of (a) metadata associated with the firmware update image, (b) one or more counters associated with the firmware update image, (c) a firmware update data associated with the device or (d) a date and a time when the firmware update image is created.

The system encrypts public keys for the device when no public key is available in the device. The system may adapt to the device which has no cryptographically secure key system. If a device has a SIM card, then the system may encrypt the key package with existing public keys of the SIM. The SIM card may decrypt the key package for the device without the manufacturer having access to the decrypted keys in transit from a key source. When the device has a proprietary format key package or similar key package that the system generates, the system may perform a required action such as storing keys, or incrementing counters to prevent replay attacks and adding a date/time to prevent replay attacks, using the key manager.

The SIM enables the secure connection between the server and the device. The key manager on the SIM may decrypt the key package and return it to the Operating System (OS) of the device. The key packages may have monotonically incrementing counters, date and time stamps, and new symmetric keys to prevent replay attacks. If applications on the main device processor (not the modem) are tightly integrated with the SIM using Cryptographic Services Application programming interface (API) or a similar abstraction, the entire key package may be stored in the SIM and not sent to the device for key deployment. The device without a SIM or an internet connection may be connected with the SIM of the cellular modem using a physical network for obtaining a new firmware and a key using the cellular modem. The SIM may perform all cryptographical operations at a required speed.

The system improves the security on the communication between the device and the server with the SIM by (i) implementing the communication between the device and the server using the private and/or public key of the server and the device that is stored in the SIM, (ii) generating a public-private key pair during manufacturing to pair the device and the SIM if the device does not have the One Time Programmable memory (OTP). Manufacturing keys may be replaced in the field using operational keys, and the operational keys may be strengthened using an elliptic curve Diffie-Hellman key exchange (ECDHE), whereby the public-private key pairs are ephemerally created and cannot be compromised even if the original public-private key pairs are compromised.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
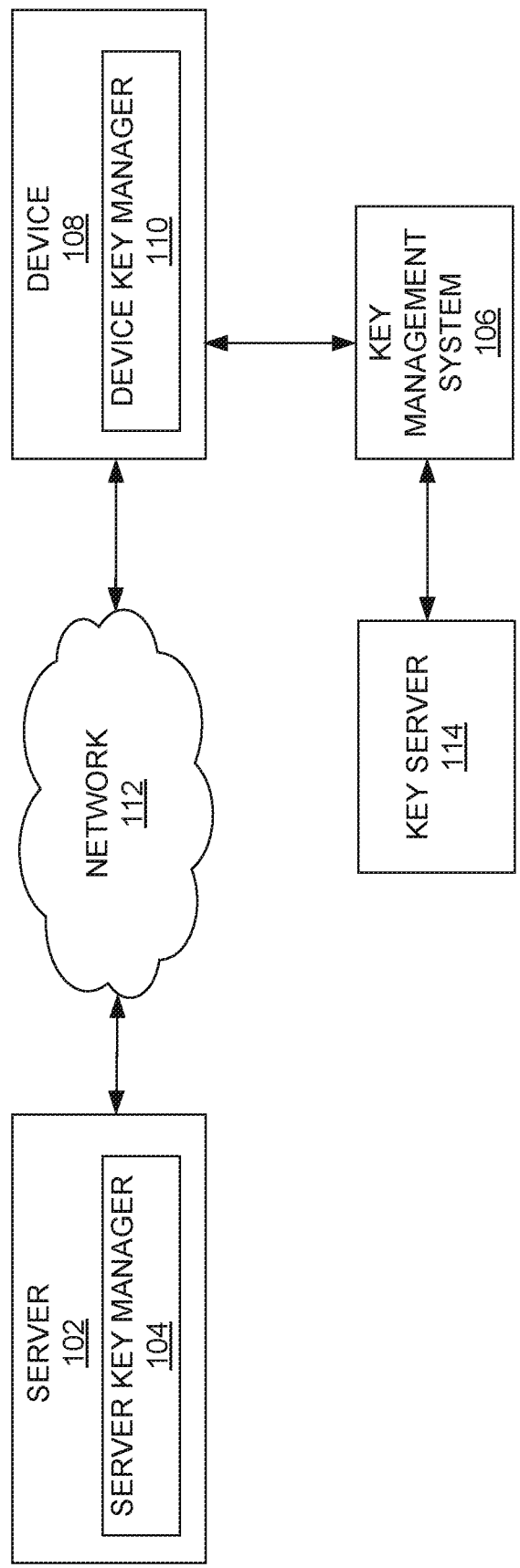
FIG. 1 illustrates a system view of a system for securely transmitting one or more keys to a device or a server according to an embodiment herein.

In the accompanying drawings, a number is employed to represent an item over which the number is positioned or an item to which the number is adjacent.

DETAILED DESCRIPTION OF THE DRAWINGS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for transmitting one or more keys between servers and devices using the cellular modem comprising of the SIM. The embodiments herein achieve this by providing a key management system that communicates with one or more servers and one or more IOT devices for secure communication of a key package. Referring now to the drawings, and more particularly to FIGS. 1 through 9, where similar reference characters denote corresponding features consistently throughout the figures, there are shown preferred embodiments.

FIG. 1 illustrates a system view of a system for securely transmitting one or more keys to a device or a server according to an embodiment herein. The system includes a server 102, a key management system 106, a device 108, a network 112 and a key server 114. The server 102 is communicatively connected to the device 108 through the network 112. The key management system 106 is communicatively connected to the device 108. The key server 114 is communicatively connected to the key management system 106. The key management system 106 includes a cellular modem comprising a Subscriber Identity Module (SIM) and a key manager module. The server 102 obtains a public key of the Subscriber Identity Module (SIM) and a symmetrical key of the SIM from the key server 114. In some embodiments, the server 102 includes at least one of a manufacturing server or an operational server. The private key and/or a public key of the server 102, a private key and/or the public key of the Subscriber Identity Module (SIM) and the symmetrical key of the SIM may be obtained by the key server 114 using cellular operators. In an embodiment, the system securely transmits one or more keys to the device 108 from the server 102. The key management system 106 configures the SIM with the public key of the server 102 and enables the SIM to receive an encrypted key package from the server 102. The encrypted key package may be generated by the server 102. The server 102 generates a key package by processing one or more keys associated with the device 108. The one or more keys may be obtained from the key server 114. The server 102 signs the key packages with a private key of the server 102. The server 102 includes a server key manager 104 that encrypts the key package using the public key of the SIM to obtain the encrypted key package. The encrypted key packages include one or more keys associated with the device 108. In an embodiment, the encrypted key packages include at least one of (a) metadata associated with the one or more keys, (b) one or more counters associated with the one or more keys, (c) a firmware update data associated with the device 108 and (d) a date and a time when the one or more keys are created. The key management system 106 processes the encrypted key package that has to be transmitted to the device 108. The processing of the encrypted key package includes decrypting the encrypted key package associated with the device 108 with at least one of the private key of the SIM or the public key of the SIM. The key management system 106 transmits the decrypted key package to the device 108 to enable implementation of the decrypted key package into the device 108. In some embodiments, the key management system 106 is adapted to configure the SIM with an operational symmetric SIM key that is shared with the server 102 when the key package is encrypted with the operational symmetric SIM key. The key management system 106 decrypts the encrypted key package associated with the device 108 using the operational symmetric SIM key of the server 102. The key management system 106 is adapted to enable multi-stage decryption process by partially decrypting the encrypted key package and providing an encryption key to the device 108 to decrypt the partially decrypted key package. The key management system 106 is configured to enable the SIM to communicate with the server 102 and the device 108 for receiving and transmitting messages.

In some embodiments, the system securely transmits one or more keys to the server 102 from the device 108. The key management system 106 configures the SIM to update a public key of the server 102 and enables the SIM to receive a key package from the device 108. The device 108 generates the key package by processing one or more keys associated with the device 108. The key management system 106 signs the key package with a private key of the SIM. The key management system 106 encrypts the key package with a public key of the server 102 to obtain the encrypted key package. The encrypted key package includes the one or more keys that are specific to the device 108 and at least one of metadata associated with the one or more keys, a plurality of counters associated with the one or more keys, or a date and a time when the one or more keys are created. The key management system 106 transmits the encrypted key package to the server 102 to store the encrypted key package. The key management system 106 is adapted to encrypt the key package with an operational symmetric SIM key that is shared with the server 102. The server 102 decrypts the encrypted key package using the operational symmetric SIM key. The key management system 106 is adapted to enable multi-stage encryption process by receiving a partially encrypted key package and an encryption key from the device 108 to encrypt the partially encrypted key package. The key management system 106 is configured to enable the SIM to communicate with the server 102 and the device 108 for transmitting and receiving messages. The secured communication between the server 102 and the device 108 is enabled using a secure protocol like TLS or by adding counters and timestamps, digital signatures, etc.

Figure 2:
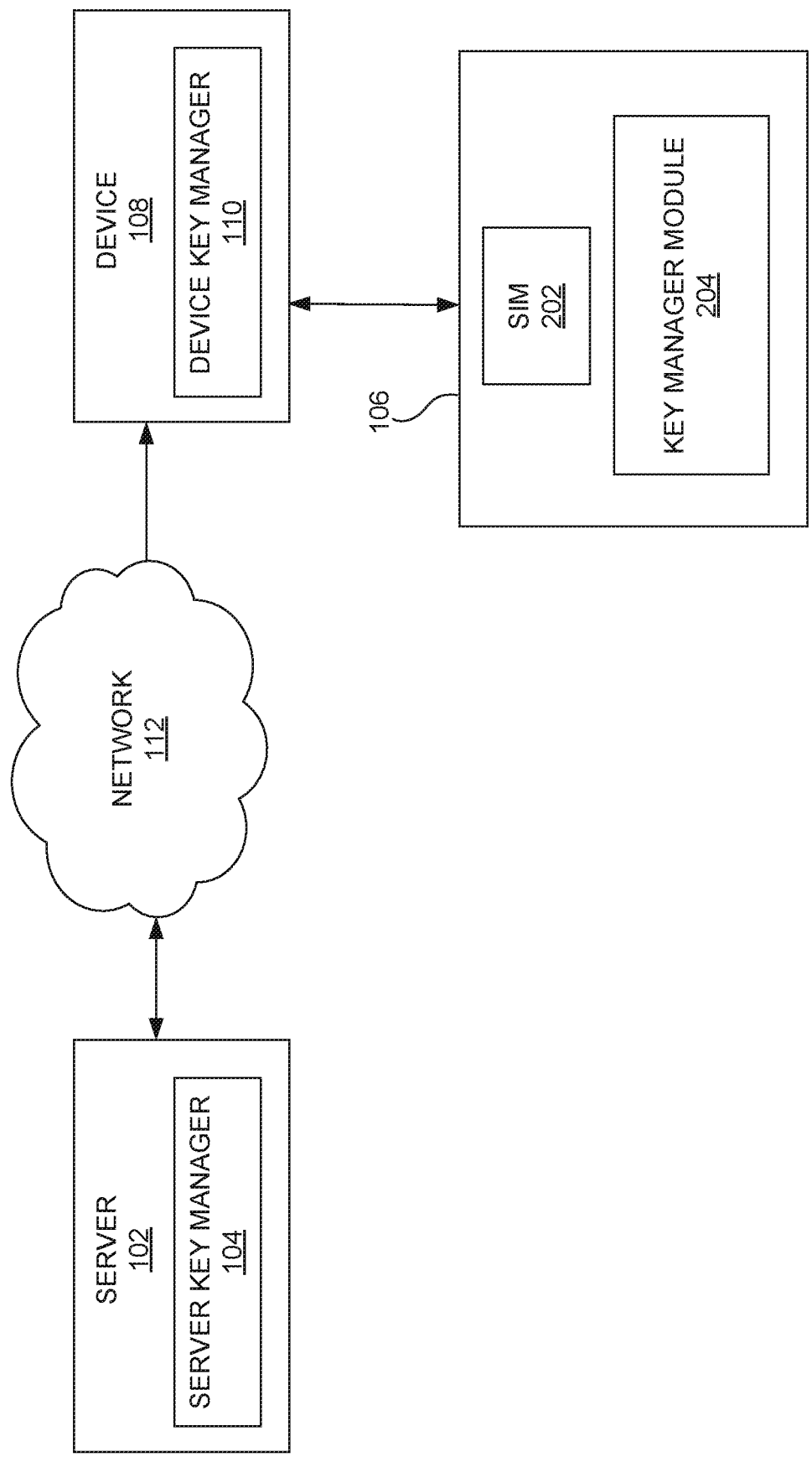
FIG. 2 illustrates a system of FIG. 1 for transmitting one or more keys to a device from a server using a key management system according to an embodiment herein.

FIG. 2 illustrates a system of FIG. 1 for transmitting one or more keys to the device 108 from the server 102 using the key management system 106 according to an embodiment herein. The key management system 106 is connected with the device 108 using the network 112 or any physical network. The key management system 106 includes a SIM 202 and a key manager module 204. The key manager module 204 obtains a public key of the server 102. In some embodiments, the key manager module obtains the public key of the server 102 from the key server 114. The key manager module 204 configures the SIM 202 to update the public key of the server 102 and enables the SIM 202 to receive an encrypted key package from the server 102. The encrypted key package is generated by the server 102. The server 102 generates a key package by processing one or more keys associated with the device 108. The one or more keys are obtained from the key server 114. The server 102 signs the generated key package with a private key of the server 102 and encrypts the key package with a public key of the SIM 202 to generate an encrypted key package.

The key manager module 204 processes the encrypted key package that has to be transmitted to the device 108 once received from the server 102. The processing of the encrypted key package includes decrypting of the received encrypted key package associated with the device 108 using at least one a private key or a public key of the SIM 202. The key manager module 204 transmits decrypted key package to the device 108 to enable the device 108 to implement the decrypted key package into the device 108. In some embodiments, the key manager module 204 enables the multi-stage decryption process by partially decrypting the encrypted key package. The key manager module 204 provides an encryption key to the device 108 to decrypt the partially decrypted key package. In some embodiments, the key management system 106 enables multi-passes to establish the keys for key exchange. The key management system 106 uses Diffie Hellman and Elliptical curve Diffie Hellman algorithms for key exchange.

Figure 3:
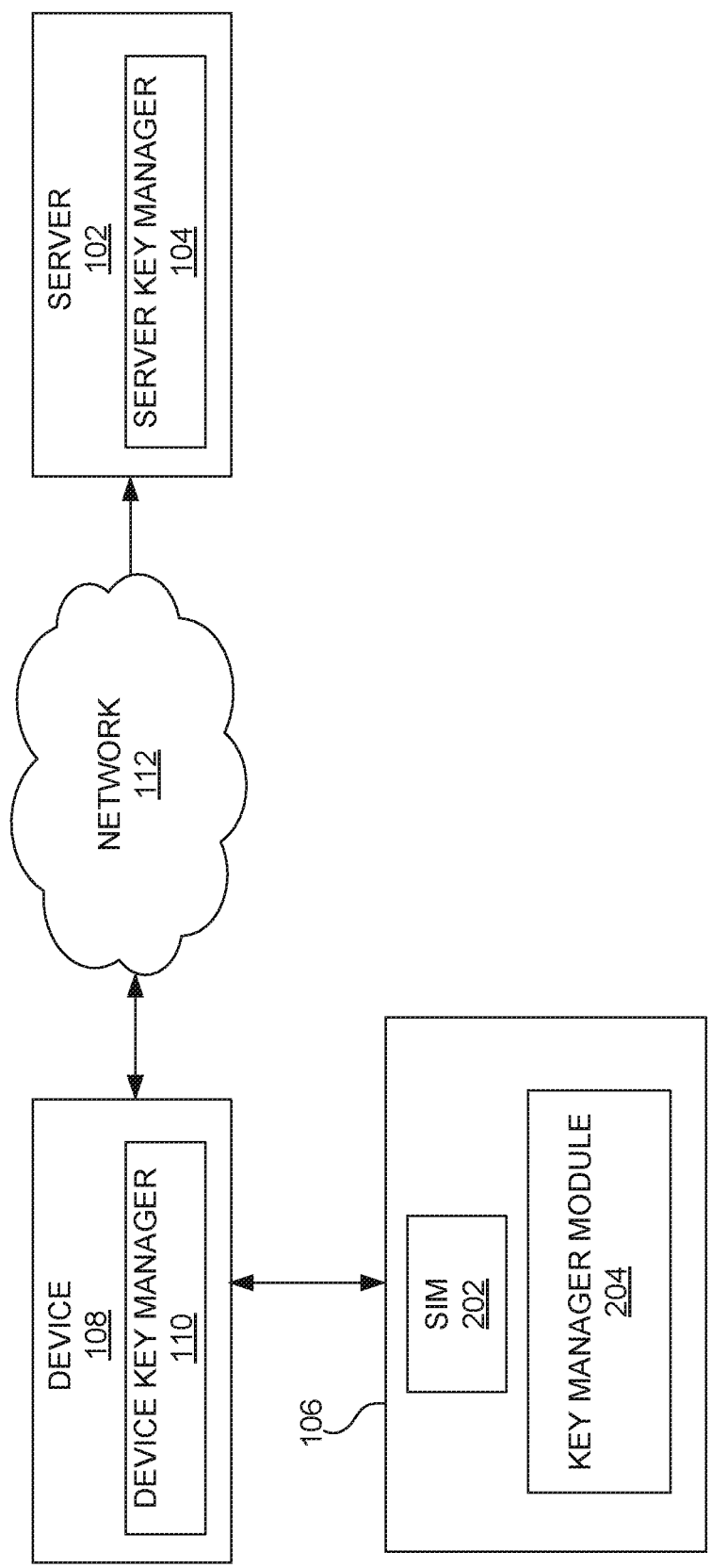
FIG. 3 illustrates a system of FIG. 1 for transmitting one or more keys to a server from a device using a key management system according to an embodiment herein.

FIG. 3 illustrates a system of FIG. 1 for transmitting one or more keys to the server 102 from the device 108 using the key management system 106 according to an embodiment herein. The key management system 106 includes the SIM 202 and the key manager module 204. The key manager module 204 obtains a private key and a public key of the SIM 202 and the server 102. In some embodiments, the key manager module obtains a public key of the server 102 from the key server 114. The key manager module 204 configures the SIM 202 to update the public key of the server 102 and enables the SIM 202 to receive a key package from the device 108. The device 108 generates a key package by processing one or more keys associated with the device 108. The one or more keys may be obtained from the key server 114. The key manager module 204 signs the generated key package with a private key of the SIM 202 and encrypts the key package with the public key of the server 102 to generate an encrypted key package. The key manager module 204 transmits to encrypted key package to the server 102 to store the encrypted key package. In some embodiments, the key manager module configures the SIM 202 to update an operational symmetric SIM key when the key package is encrypted with the operational symmetric SIM key. The operational symmetric SIM key is used to decrypt the encrypted key package. In some embodiments, the operational symmetric SIM key may be shared the server 102 by the key server 114.

In some embodiments, the key manager module 204 enables a multi-stage encryption process by partially encrypting the key package. The key manager module provides an encryption key to the server 102 to decrypt the partially encrypted key package. In some embodiments, the key manager module 204 enables the SIM 202 to provide communication between the server 102 and the device 108.

Figure 4:
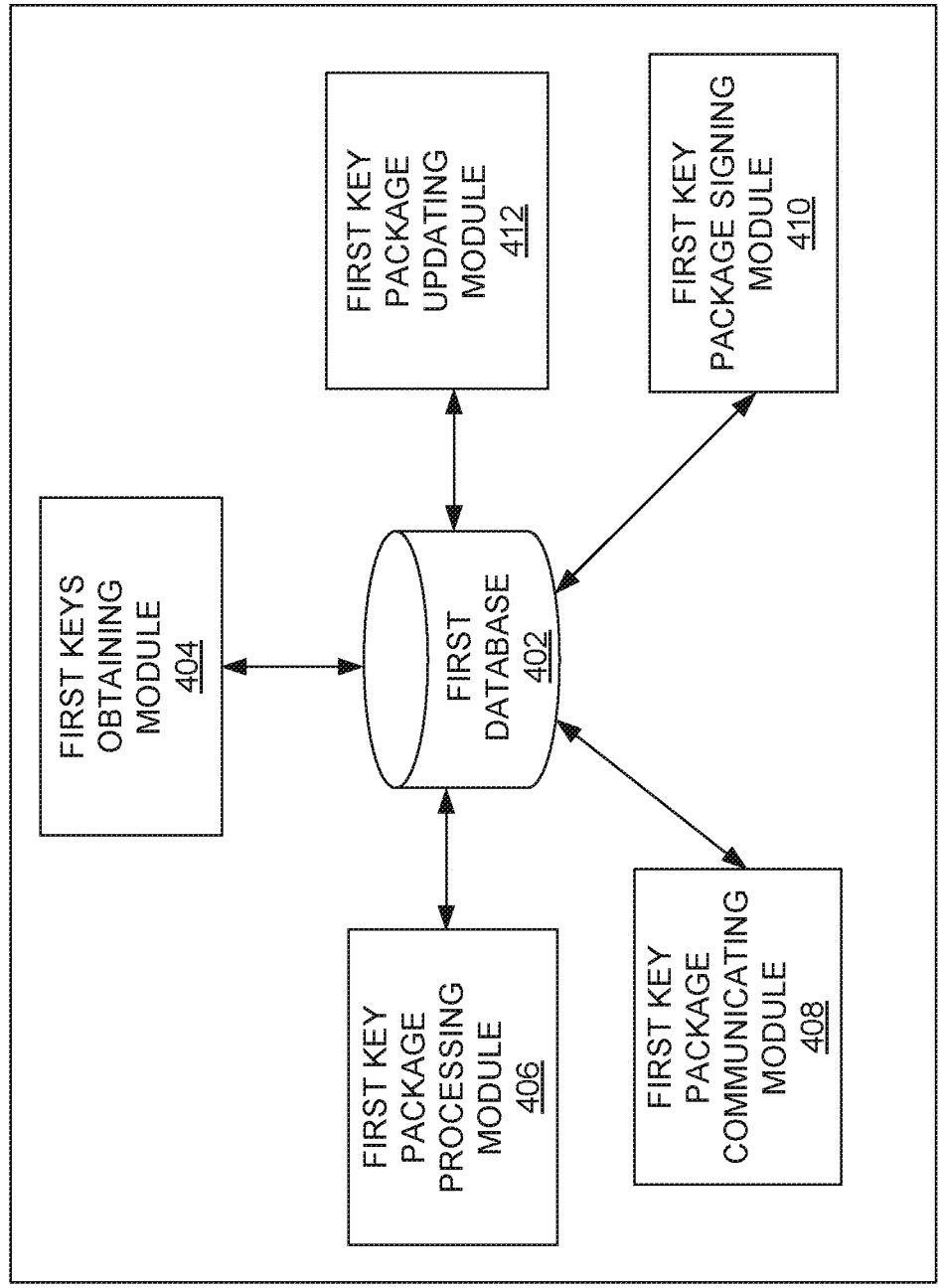
FIG. 4 illustrates an exploded view of a server key manager of FIG. 1 according to an embodiment herein.

FIG. 4 illustrates an exploded view of the server key manager 104 of FIG. 1 according to an embodiment herein. The server key manager 104 includes a first database 402, a first keys obtaining module 404, a first key package processing module 406, a first key package signing module 408, a first key package communicating module 410 and a first key package updating module 412. The first keys obtaining module 404 obtains one or more keys associated with the device and a public key of the SIM 202 from the key server 114. The first package processing module 406 processes the one or more keys associated with the device to generate a key package. The generated key package is signed with a private key of the server 102 using the first key package signing module 408. The first key package processing module 406 encrypts the key package with the public key of the SIM 202. The encrypted key package is communicated with the device 108 through the SIM 202 using the first key package communicating module 410. The first key package update module 412 updates and stores the encrypted key package in the first database 402.

Figure 5:
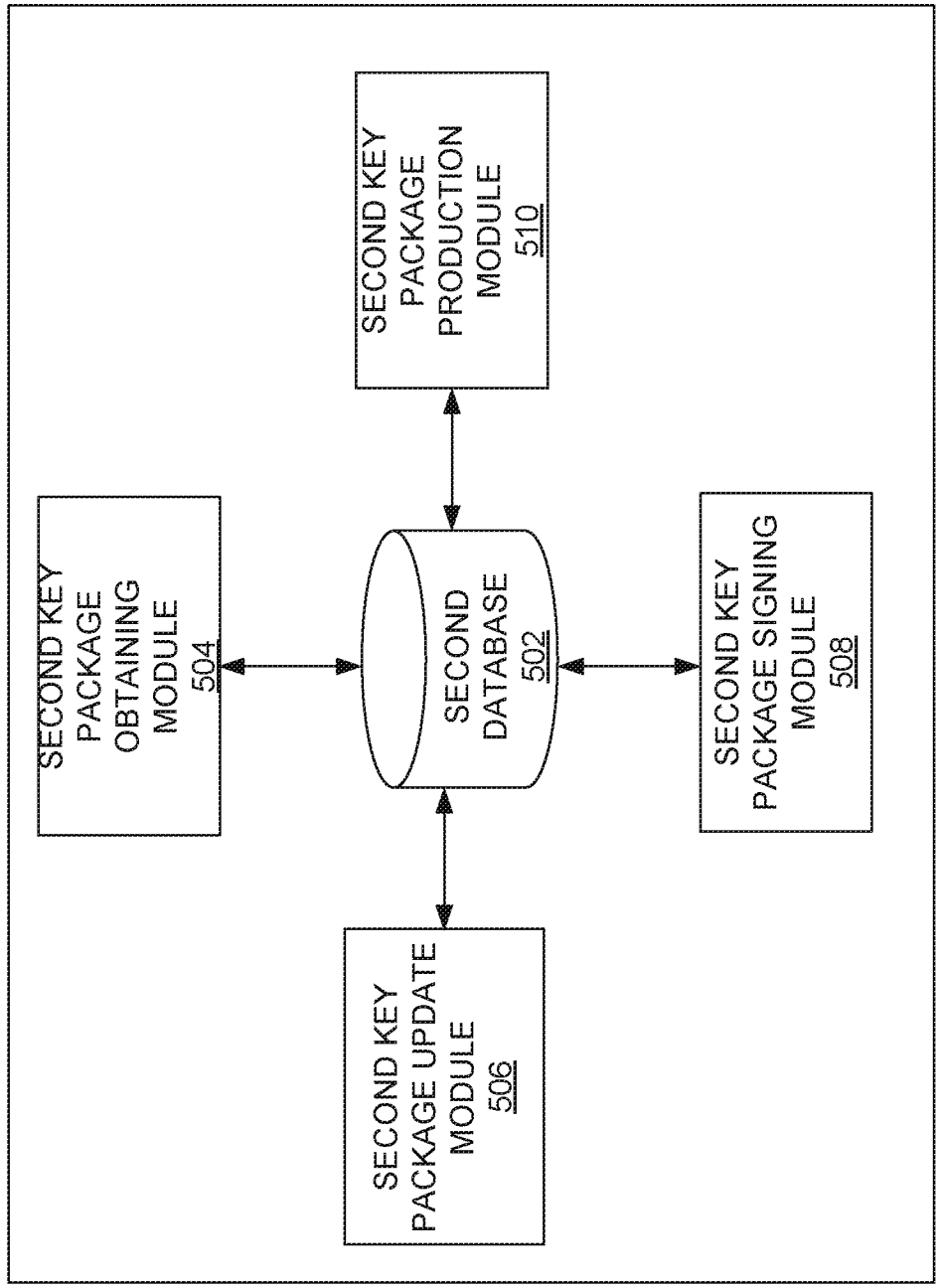
FIG. 5 illustrates an exploded view of a device key manager of FIG. 1 according to an embodiment herein.

FIG. 5 illustrates an exploded view of the device key manager 110 of FIG. 1 according to an embodiment herein. The device key manager 110 includes a second database 502, a second keys obtaining module 504, a second key package processing module 506, a second key package signing module 508, a second key package communicating module 510 and a second key package updating module 512. The second keys obtaining module 504 obtains one or more keys associated with the device and a public key of the server 102 from the key server 114. The second package processing module 506 process the one or more keys associated with the device 108 to generate a key package. The generated key package is signed with a private key of the SIM 202 using the second key package signing module 508. The second package processing module 506 encrypts the key package with the public key of the server 102. The encrypted key package is communicated to the device 108 through the SIM 202 using the second key package communicating module 510. The second key package update module 512 updates and stores the encrypted key package in the second database 502.

Figure 6:
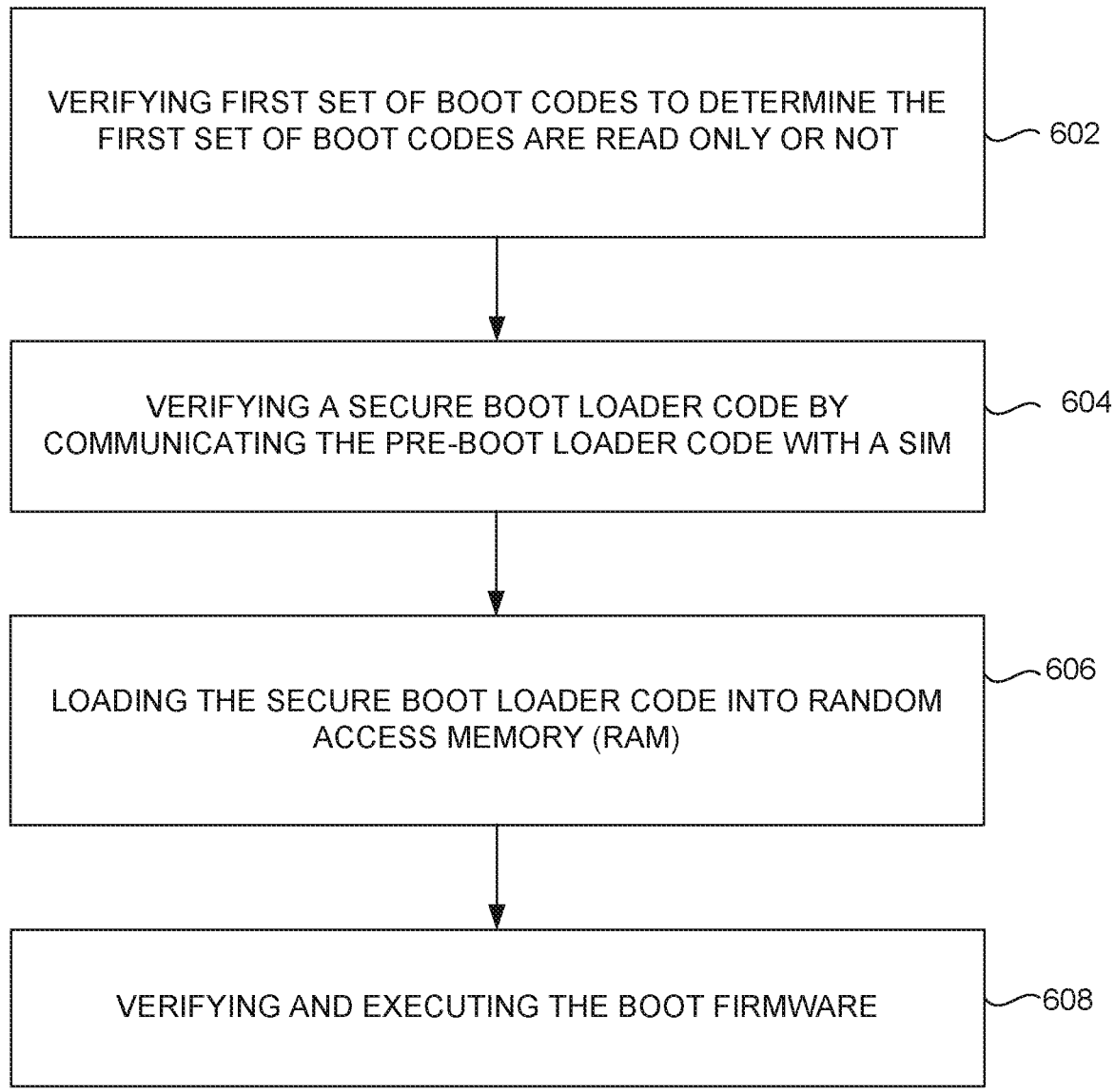
FIG. 6 is a flow diagram that illustrates a method of securely booting a device using a Subscriber Identity Module (SIM) according to an embodiment herein.

FIG. 6 is a flow diagram that illustrates a method of securely booting a device (e.g. the device 108) using a Subscriber Identity Module (SIM) 202 according to an embodiment herein. The secure booting of the device 108 is very specific to a CPU of the device. Typically, each device 108 has its unique booting versions. At step 602, a first set of boot codes (e.g. pre-bootloader codes) are verified to determine whether the first set of boot codes are ready only (ROM) or not. In some embodiments, the verification is performed by un-mapping a physical address of the pre-bootloader code to a fault when there is an attempt to load those pages or adding a logic on the board to prevent write to those memory locations. At step 604, a secure boot loader code is verified by communicating the pre-bootloader code with a SIM. If the verification fails, then the processor resets. Else, at step 606, the secure bootloader code is loaded into Random Access Memory (RAM). The above steps are repeated for remaining boot codes for verification. This process is a slightly slower process for the SIM to validate all the boot firmware. At step 608, the device 108 starts the verified boot firmware and executes it in the device 108.

Figure 7:
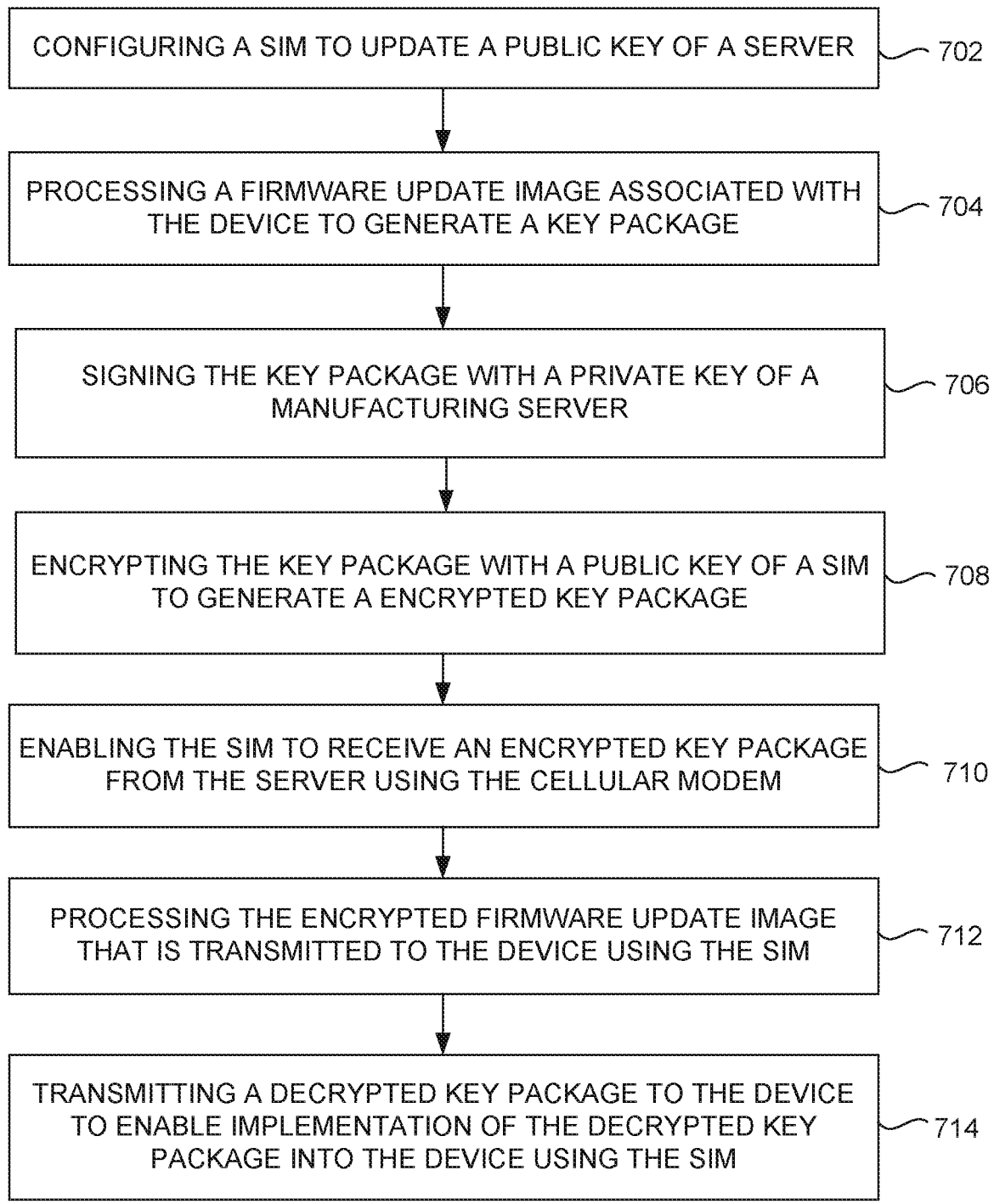
FIG. 7 is a flow diagram illustrating a method for securely transmitting a firmware update image to the device using the system of FIG. 1 according to an embodiment herein.

FIG. 7 is a flow diagram illustrating a method for securely transmitting a firmware update image to the device 108 using the system of FIG. 1 according to an embodiment herein. At step 702, the SIM 202 is configured to update a public key of the server 102. At step 704, a key package is generated by processing a firmware update image associated with the device, using the server 102. The firmware update image is obtained from a manufacturing server. At step 706, the key package is signed with a private key of the manufacturing server, using the server 102. At step 708, the key package is encrypted with a public key of the SIM to obtain an encrypted key package, using the server 102. In some embodiments, the encrypted key package includes the firmware update image that are specific to the device, and at least one of (a) metadata associated with the firmware update image, (b) a plurality of counters associated with the firmware update image, (c) a firmware update data associated with the device 108 or (d) a date and a time when the firmware update image is created. At step 710, the SIM is enabled to receive an encrypted key package from the server 102 using the cellular modem. At step 712, the encrypted firmware update image is processed that has to be transmitted to the device 108 using the SIM. The processing of the encrypted key package comprises decrypting the encrypted key package associated with the device 108 with at least one of a private key of the SIM or a public key of the SIM. At step 714, the decrypted key package is transmitted to the device 108 to enable implementation of the decrypted key package into the device 108 using the SIM 202.

Figure 8:
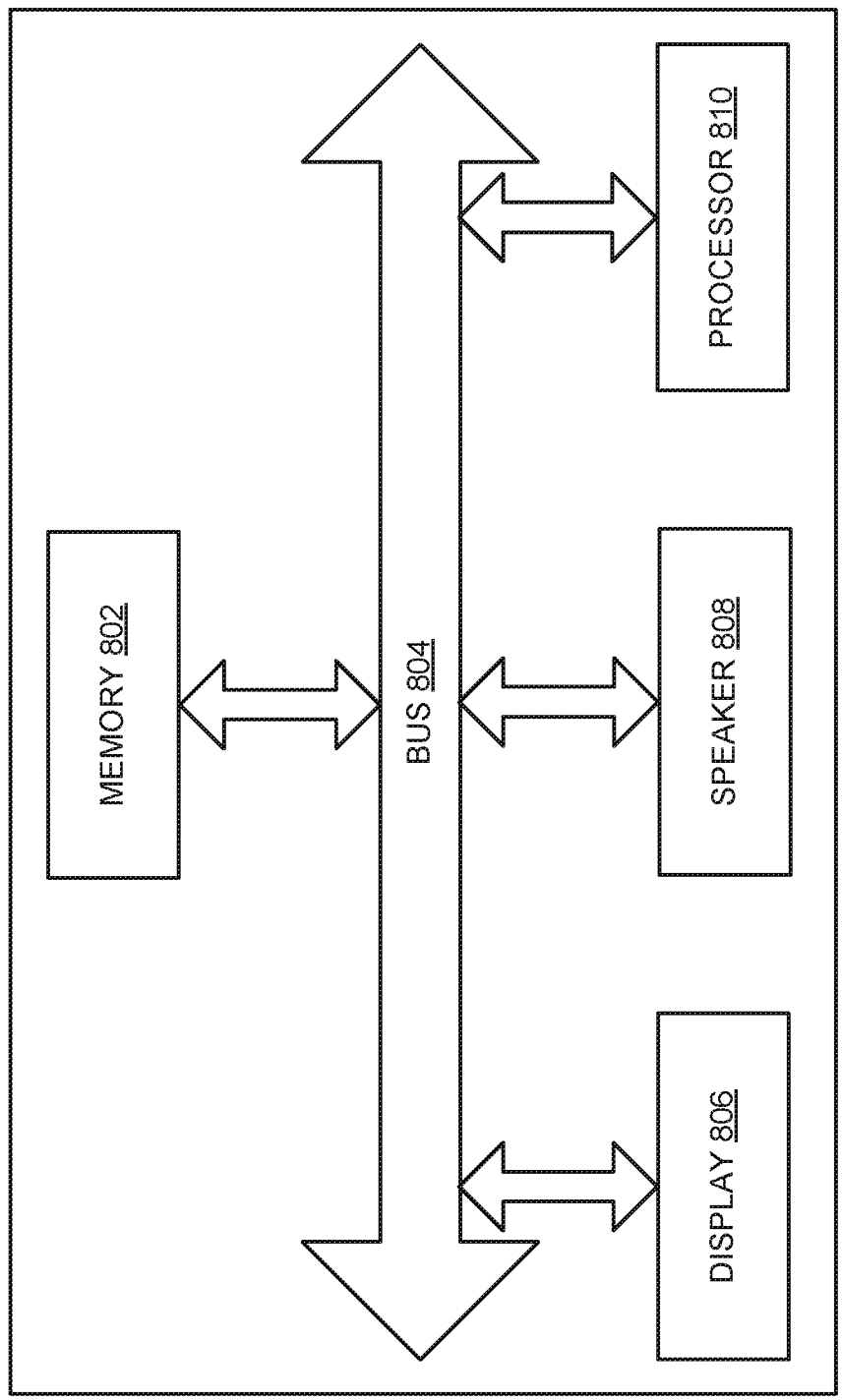
FIG. 8 illustrates an exploded view of a communication device according to the embodiments herein.

FIG. 8 illustrates an exploded view of the communication device having a memory 802 having a set of computer instructions, a bus 804, a display 806, a speaker 808, and a processor 810 capable of processing a set of instructions to perform any one or more of the methodologies herein, according to an embodiment herein. The processor 810 may also enable digital content to be consumed in the form of a video for output via one or more displays 806 or audio for output via speaker and/or earphones 808. The processor 810 may also carry out the methods described herein and in accordance with the embodiments herein.

Digital content may also be stored in the memory 802 for future processing or consumption. The memory 802 may also store program specific information and/or service information (PSI/SI), including information about digital content (e.g. the detected information bits) available in the future or stored from the past. A user of the personal communication device may view this stored information on display 806 and select an item of for viewing, listening, or other uses via input, which may take the form of a keypad, scroll, or another input device (s) or combinations thereof. When digital content is selected, the processor 810 may pass information. The content and PSI/SI may be passed among functions within the personal communication device using the bus 804.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g. by providing a copy of the storage medium storing the design) or electronically (e.g. through the Internet) to such entities, directly or indirectly.

The stored design is then converted into the appropriate format (e.g. GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entire hardware embodiment, an entire software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only only memory (ROM), a rigid magnetic disk and an optical disk. Current examples of optical disks include compact disk-read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet cards are just a few of the currently available types of network adapters.

Figure 9:
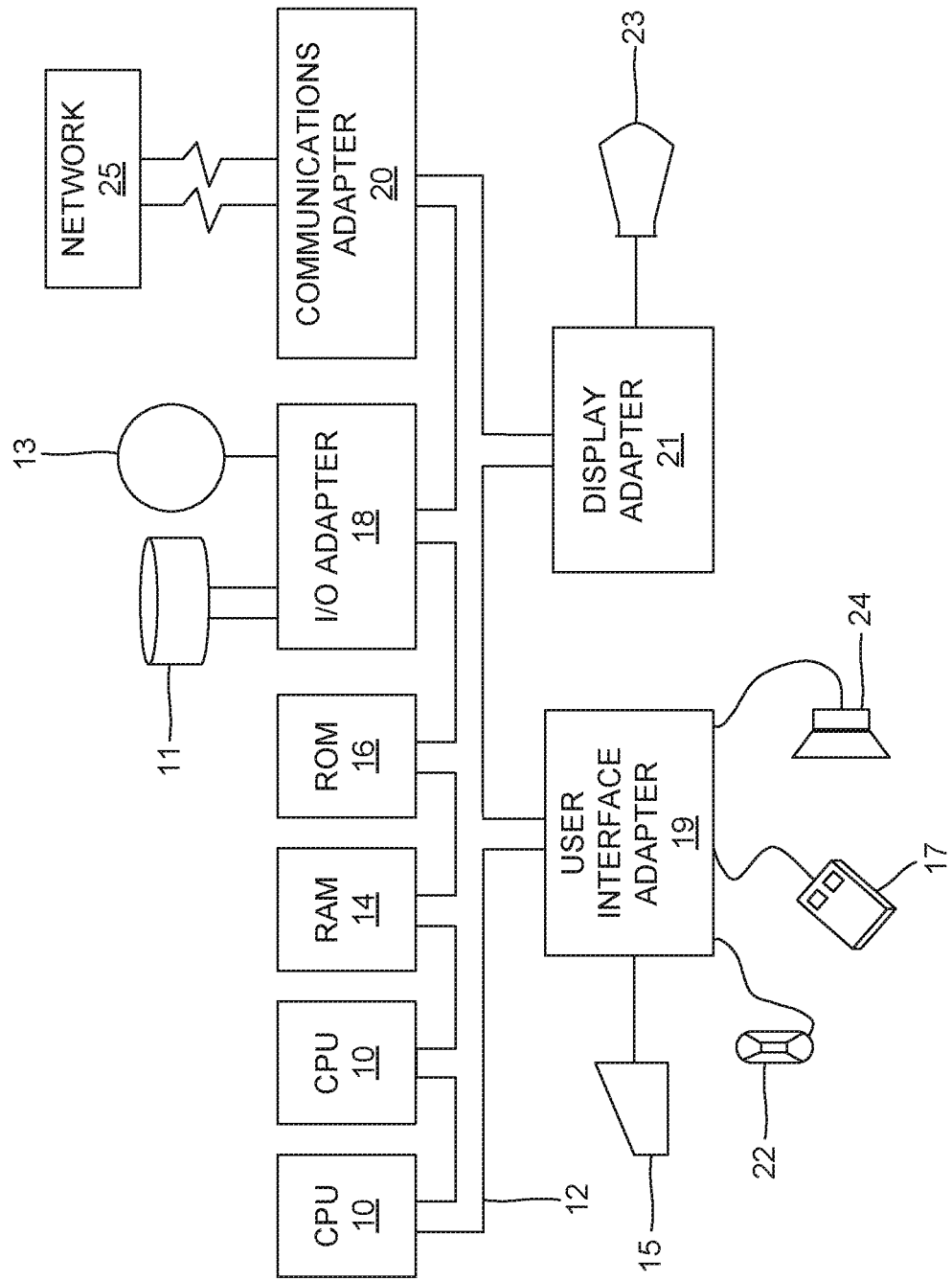
FIG. 9 is a schematic diagram of a computer architecture used in accordance with the embodiment herein.

A representative hardware environment for practicing the embodiments herein is depicted in FIG. 9. This schematic drawing illustrates a hardware configuration of an information handling/computer system in accordance with the embodiments herein. The system includes at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to a bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for securely transmitting a plurality of keys to a device, said system comprising:
    a cellular modem communicatively connected with said device, wherein said cellular modem comprises a Subscriber Identity Module (SIM), wherein said SIM comprises a key manager module that is adapted to
    configure said SIM to update a public key of a server,
    enable said SIM to receive an encrypted key package from said server, wherein said encrypted key package is generated, using said server, by
        generating a key package by processing a plurality of keys associated with said device, wherein said plurality of keys is obtained from a key server;
        signing said key package with a private key of said server; and
        generating said encrypted key package by encrypting said key package with a public key of said SIM, wherein said encrypted key package comprises (a) said plurality of keys that are specific to said device, (b) metadata associated with said plurality of keys, (c) a plurality of counters associated with said plurality of keys, and at least one of (d) a firmware update data associated with said device or (e) a date and a time when said plurality of keys are created;
    partially decrypting said encrypted key package that has to be transmitted to said device with at least one of a private key of said SIM or said public key of said SIM; and
    transmit (i) said partially decrypted key package, and (ii) an encryption key to said device to decrypt said partially decrypted key package to said device to enable implementation of said decrypted key package into said device,
    wherein said device decrypts said partially decrypted key package using said encryption key to obtain a fully decrypted key package and implements said plurality of keys, from said fully decrypted key package, into said device based on (a) said metadata associated with said plurality of keys, (b) said plurality of counters associated with said plurality of keys, and at least one of (c) said firmware update data associated with said device, or (d) the date and the time when said plurality of keys are created.

2. The system of claim 1, wherein said key manager module is adapted to configure said SIM with an operational symmetric SIM key that is shared with said server when said key package is encrypted with said operational symmetric SIM key.

3. The system of claim 2, wherein said key manager module decrypts said encrypted key package associated with said device using said operational symmetric SIM key of said server.

4. The system of claim 1, wherein said key manager module is configured to enable said SIM to communicate with said server and said device for receiving and transmitting messages.

5. The system of claim 1, wherein said server comprises a manufacturing server or an operation server.

6. A system for securely transmitting a plurality of keys to a server, said system comprising:
    a cellular modem communicatively connected with a device, wherein said cellular modem comprises a Subscriber Identity Module (SIM), wherein said SIM comprises a key manager module that is adapted to
    configure said SIM to update a public key of a server,
    enable said SIM to receive a key package from said device, wherein said device generates said key package by processing a plurality of keys associated with said device;
    sign said key package with a private key of said SIM;
    generate a partially encrypted key package by partially encrypting said key package with a public key of said server, wherein said partially encrypted key package comprises (a) said plurality of keys that are specific to said device, (b) metadata associated with said plurality of keys, (c) a plurality of counters associated with said plurality of keys, and (d) a date and a time when said plurality of keys are created; and
    transmit (i) said partially encrypted key package, and (ii) an encryption key from said device to encrypt said partially encrypted key package to said server to store said partially encrypted key package,
    wherein said server encrypts said partially encrypted key package using the encryption key to obtain a fully encrypted key package and stores said fully encrypted key package comprising (a) said plurality of keys that are specific to said device, (b) said metadata associated with said plurality of keys, (c) said plurality of counters associated with said plurality of keys, and (d) the date and the time when said plurality of keys are created.

7. The system of claim 6, wherein said key manager module is adapted to encrypt said key package with an operational symmetric SIM key that is shared with said server.

8. The system of claim 7, wherein said server decrypts said encrypted key package using said operational symmetric SIM key.

9. The system of claim 6, wherein said key manager module is configured to enable said SIM to communicate with said server and said device for transmitting and receiving messages.

10. The system of claim 6, wherein said server comprises a manufacturing server or an operation server.

11. A method for securely transmitting a firmware update image to a device using a key management system, wherein said key management system comprises a cellular modem communicatively that is connected with said device, wherein said cellular modem comprises a Subscriber Identity Module (SIM), said method comprising:

configuring, using a key manager module of said Subscriber Identity Module (SIM), said SIM to update a public key of a server;

enabling, using said cellular modem, said SIM to receive an encrypted key package from said server, wherein said encrypted key package is generated, using said server, by generating a key package by processing a firmware update image associated with said device, wherein said firmware update image is obtained from a manufacturing server;

signing said key package with a private key of said manufacturing server; and generating said encrypted key package by encrypting said key package with a public key of said SIM, wherein said encrypted key package comprises (a) said firmware update image that is specific to said device, (b) metadata associated with said firmware update image, (c) a plurality of counters associated with said firmware update image, and at least one of (d) a firmware update data associated with said device or (e) a date and a time when said firmware update image are created;

partially decrypting, using said SIM, said encrypted key package that has to be transmitted to said device with at least one of a private key of said SIM or said public key of said SIM; and transmitting, using said SIM, (i) said partially decrypted key package, and (ii) an encryption key to said device to decrypt said partially decrypted key package to said device to enable implementation of said decrypted key package into said device, wherein said device decrypts said partially decrypted key package using the encryption key to obtain a fully decrypted key package and implements said firmware update image, from said fully decrypted key package, into said device based on (a) said metadata associated with said firmware update image, (b) said plurality of counters associated with said firmware update image, and at least one of (c) said firmware update data associated with said device or (d) the date and the time when said firmware update image are created.

* * * * *